H. L. SHEPARD.
Band-Pulleys.
No. 148,514. Patented March 10, 1874.
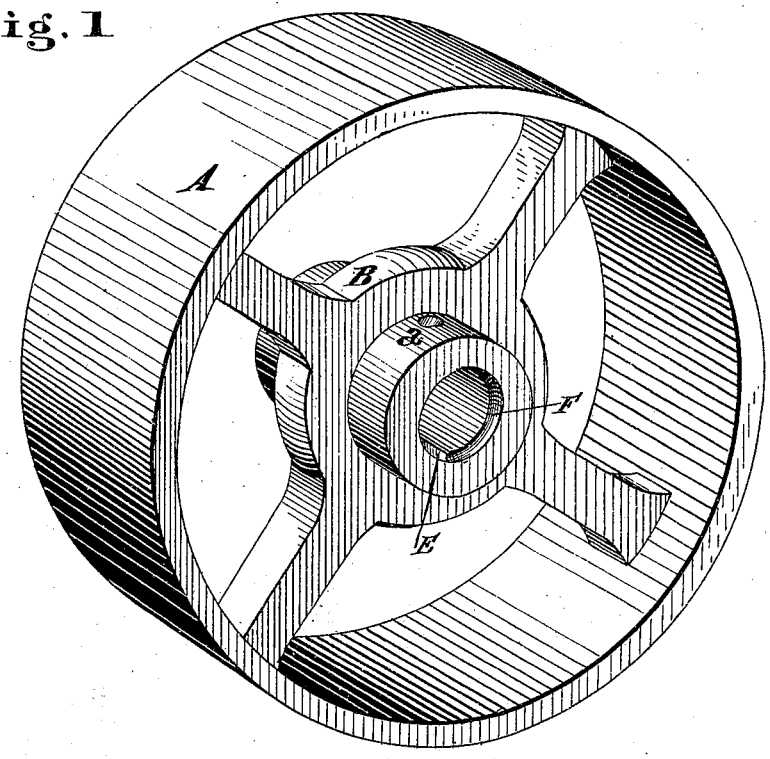
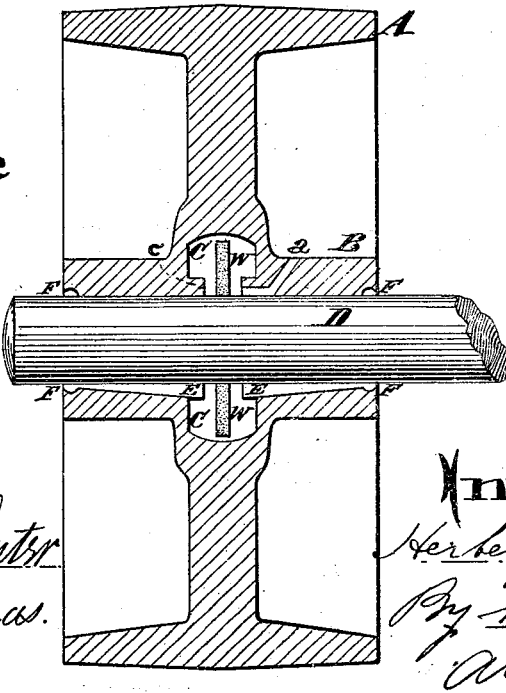
Attest
Inventor
Herbert L. Shepard
By F. Millward
Attorney

UNITED STATES PATENT OFFICE.

HERBERT L. SHEPARD, OF CINCINNATI, OHIO.

IMPROVEMENT IN BAND-PULLEYS.

Specification forming part of Letters Patent No. 148,514, dated March 10, 1874; application filed January 14, 1874.

*To all whom it may concern:*

Be it known that I, HERBERT L. SHEPARD, of Cincinnati, Hamilton County, State of Ohio, have invented a certain new and useful device for Oiling Loose Pulleys, of which the following is a specification:

My invention consists in a certain construction of pulley, and in the provision in connection therewith of a capillary washer of leather or other suitable substance, by which a large quantity of oil may be held within the pulley, and fed slowly to the shaft, without resort to sealing or corking devices, there being inclined oil-ducts in the pulley, by which the oil is prevented from running out to waste, but is kept in constant circulation while the pulley is in motion.

Figure 1 is an exterior perspective view of my pulley, and Fig. 2 an axial section, showing clearly the oiling device.

A is the rim of the pulley, and B the hub of the same. A chamber, C, is formed by coring within the hub, as shown, having preferably a narrow neck, c, near the shaft. The chamber, as shown, is very capacious, and is fed with oil through the aperture a. It is adapted to hold a good supply of oil without danger of wasting through its aperture a. Before the pulley is placed upon its shaft D, a washer, W, of leather, or other material capable of capillary action, is placed in the manner shown in the chamber C, so as to tightly surround the shaft when it is in place. As this washer remains stationary while the pulley is revolving, (except at times when the pulley and shaft revolve together, and require no oiling,) the washer conveys, by capillary action, the oil from the chamber to the shaft, the oil in the chamber, no matter how small a quantity there may be, being kept by centrifugal force in a circle in the outer periphery of the chamber, and consequently keeping the outer edge of the washer soaked with oil. In order to permit the free flow of oil through the washer to the shaft, and still prevent waste of oil, I create a circulation of oil by the following means: Inclined ducts E are cut in the bore of the pulley, inclining centrally so as to be deeper at the middle of the pulley than at the ends of the hub. At the ends of the hub circular ducts F are cut to establish from all parts of the ends of the hub with the ducts a direct communication. In the operation of the pulley all the oil which collects in the circular ducts F is taken up by the ducts E, and conveyed, by reason of the centrifugal action of the oil against the inclined parts of the ducts, back to the chamber C, to be reconveyed by the washer W to the shaft, and thus waste is prevented, and a constant circulation kept up.

I claim—

The combination of annular chamber C, washer W, and inclined ducts E, constructed and operating substantially in the manner and for the purpose specified.

In testimony of which invention I hereunto set my hand.

HERBERT L. SHEPARD.

Witnesses:
FRANK MILLWARD,
J. L. WARTMANN.